Patented Aug. 5, 1947

2,424,960

UNITED STATES PATENT OFFICE 2,424,960

ALKOXY MENTHENE-7-CARBINOLS AND PROCESS OF PREPARING SAME

Joseph P. Bain and Albert H. Best, Jacksonville, Fla., assignors to The Glidden Company, Cleveland, Ohio, a corporation of Ohio No Drawing. Application October 4, 1946, Serial No. 701,090

11 Claims. (Cl. 260—489)

This invention relates to the preparation of new alcohol compositions and more particularly to the alkoxy monocyclic alcohols prepared from dicyclic primary alcohols having the empirical formula $C_{11}H_{18}O$. These compounds may alternatively be described as alkyl ethers of primary monocyclic alcohols, possessing the empirical formula $$C_{11}H_{19}O_2R$$

where R is an alkyl radical. This application is a continuation-in-part of our copending application Serial No. 527,130, filed March 18, 1944.

United States Patent No. 2,340,294 discloses an alcohol formed by reacting beta-pinene, or nopinene with anhydrous formaldehyde to produce an alcohol having the empirical formula $C_{11}H_{18}O$, which is a bicyclic primary unsaturated alcohol. Since this alcohol is prepared from nopinene, it is called nopol, and is believed to have the following structure:

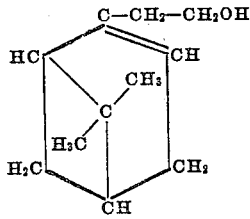

It has been found that nopol reacts with alcohols in the presence of acidic catalysts to form alkoxy menthene-7-carbinols. By analogy to the addition of water to alpha-pinene, the alkoxy group probably is attached to the 8 carbon atom of the menthene nucleus, and the products of these reactions probably possess the structure:

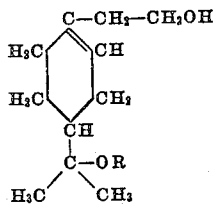

The acidic catalysts employed are boron fluoride, sulphuric acid, and in general, acidic catalysts of the type disclosed by Evans and Edlund in the "Journal of Industrial and Engineering Chemistry," vol. 28, p. 1186, 1936.

The ethers of the present invention are useful as plasticizers for plastic compositions, and their esters are useful as high boiling plasticizers.

It is an object of our invention to provide a means for producing alkoxy monocyclic alcohols and the esters thereof.

Another object of our invention is to afford means for the production of alkoxy menthene-7-carbinols and the esters thereof.

It is a further object of our invention to provide a new series of ether-alcohols and the esters thereof.

Still another object of our invention is to provide a process for the preparation of alkoxy alcohols, and esters of the class described, from an unsaturated bicyclic primary monohydric alcohol of empirical formula $C_{11}H_{18}O$.

Yet another object of our invention is to produce alkoxy menthene-7-carbinols.

Other objects and a fuller understanding of the present invention will be afforded by reference to the following examples:

Example No. 1

Five hundred parts of nopol were taken, possessing the following characteristics:

Density at 25° C _____ .966
Refractive index ($N_d^{25}$) _____ 1.4895
Optical rotation (10 cm. tube, sodium light) _____ —35.77

This quantity was dissolved in one thousand parts of methanol, and treated with a solution of ten parts of boron fluoride in two hundred parts of methanol. The mixture was refluxed for three hours, and water was then added. A portion of the reaction product was washed with water to remove the methanol and the catalyst, and then fractionated at 10 mm. pressure. The fractionation gave the following results:

| Fraction | Weight | B. P. (10 mm.) | α 30 (10 cm.) | $D^{25}$ | $N^{25}$ |
|---|---|---|---|---|---|
| 1 | 30 | 78–105 | —10.9 | .934 | 1.4825 |
| 2 | 28 | —123 | —43.5 | .958 | 1.4924 |
| 3 | 30 | —130 | —43.3 | .962 | 1.4950 |
| 4 | 90 | —135 | —8.7 | .976 | 1.4945 |
| 5 | 6 | —149 | | | 1.4925 |
| 6 | 214 | —153 | —74.5 | .990 | 1.4943 |
| 7 | 50 | —158 | —71.9 | .992 | 1.4943 |
| 8 | 6 | —166 | | | 1.4938 |
| 9 | 5.5 | —200 | | | 1.4915 |
| 10 | 45 | Residue | | | 1.508 |

Fractions No. 2 and No. 3 consisted of menthadiene-7-carbinols formed by isomerization of the bicyclic structure of nopol. Fractions No. 6 and No. 7 consisted of a substantially pure unsaturated methyl ether of empirical formula $C_{12}H_{22}O_2$. The product contains one hydroxyl group per molecule.

Example No. 2

Nopol (500 parts) was dissolved in ethanol (1000 parts) and treated with a solution of 10 parts of boron fluoride in 200 parts of ethanol. This mixture was refluxed for five hours, after which the acid catalyst and the excess ethanol were removed by washing with water. The separated reaction product was then fractionated, the distillation being carried out at 10 mm. pressure. A yield was obtained of about 127 parts of an unsaturated ethyl ether, containing one hydroxyl group per molecule, and having the empirical formula $C_{13}H_{24}O_2$. This product possessed the following physical characteristics:

B. P. at 10 mm_____° C__ 152–163
Refractive index ($N_d^{25}$)_____ 1.48
Optical rotation (10 cm. tube, sodium light) _____ −55 to −60

Example No. 3

Eight hundred parts by weight of nopol were dissolved in about 1000 parts by weight of methanol containing 10 parts by weight of sulphuric acid. After refluxing this mixture for about four hours, the reaction product was neutralized with alkali and washed with water, and subsequently fractioned. A mixture of isomeric menthadiene-7-carbinols and about 260 parts of the methoxy menthene-7-carbinol was thus obtained.

The esters of these alkoxy menthene-7-carbinols may be prepared with comparative readiness by using the corresponding carboxylic acids, and esterifying in the usual manner. The following examples are illustrative:

Example No. 4

1 mole of acetic anhydride (102 gm.) was heated to about 70° C. together with 1 gram of sodium acetate. One mole of methoxy-menthene-(1)-7-carbinol was added slowly, heated of reaction increased the temperature to 124° C. After adding all of the alcohol, the mixture was refluxed at 150–160° C. for several hours. After the acetic acid was removed from the ester by washing, the ester was fractionated at 10 mm. pressure and boiled 157–158° C. It possessed a refractive index at 25° of 1.4715 and had saponification number 222.5.

Example No. 5

74 gm. of phthalic anhydride was heated with 198 gm. methoxy-menthene-(1)-7-carbinol for 2 hours at about 200° C. Unreacted materials were removed at 10 mm. pressure leaving a viscous residue possessing an acid number of 40.2 and saponification number 145.

Example No. 6

49 gm. of maleic anhydride was heated with 198 gm. methoxy-menthene-(1)-7-carbinol at about 200° C. for 2 hours after which unreacted materials were stripped out at 10 mm. pressure, leaving a residue of acid number 48, saponification number 184.

Example No. 7

Molar quantities of 2-ethyl hexoic acid and methoxy-menthene-(1)-7-carbinol were heated at 180° C. for several hours and then unreacted materials were stripped out at 10 mm. pressure leaving a residue of 2-ethyl hexoate of methoxy-menthene-(1)-7-carbinol possessing an acid number of 1.

It is believed that the reactions producing these ethers may be represented by the following equations:

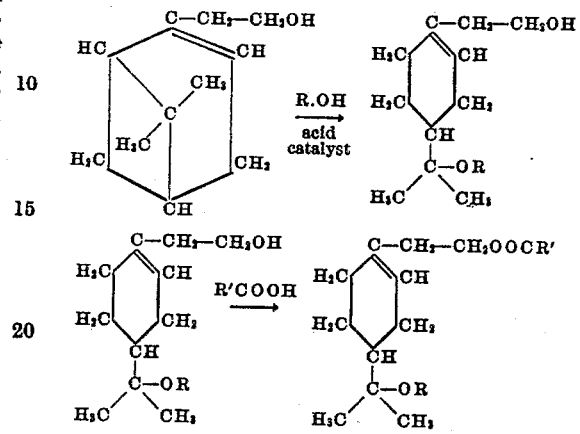

Although we have described our invention with a certain degree of particularity, it is understood that the present disclosure has been made only by way of example, and that numerous changes may be made in the details of operation without departing from the spirit and scope of the invention as hereinafter claimed.

What we claim is:

1. The process which comprises heating 7-methylol $\Delta^{1,2}$-pinene with an alcohol in the presence of an acidic catalyst at temperatures sufficient to cause reflux distillation of the alcohol and to form the alkoxy primary unsaturated monocyclic monohydric alcohol.

2. The process which comprises heating 7-methylol $\Delta^{1,2}$-pinene with methanol in the presence of an acidic catalyst at temperatures sufficient to cause reflux distillation of the methanol to form the methoxy primary unsaturated monocyclic monohydric alcohol.

3. The process which comprises heating 7-methylol $\Delta^{1,2}$-pinene with ethanol in the presence of an acidic catalyst at temperatures sufficient to cause reflux distillation of the ethanol to form the ethoxy primary unsaturated monocyclic monohydric alcohol.

4. 8-alkoxy-menthene-(1)-7-carbinols.

5. As a new composition of matter, 8-methoxy-menthene (1)-7-carbinol.

6. As a new composition of matter, 8-ethoxy-menthene (1)-7-carbinol.

7. As new compositions of matter, substances of the class consisting of the 8-alkoxy-menthene (1)-7-carbinols, and the carboxylic acid esters thereof.

8. Carboxylic acid esters of the alkoxy alcohols of claim 4.

9. Alkyl carboxylic acid esters of the alkoxy alcohols of claim 4.

10. The acetic acid esters of the alkoxy alcohols of claim 4.

11. The acetic acid ester of 8-methoxy-menthene (1)-7-carbinol.

JOSEPH P. BAIN.
ALBERT H. BEST.